Patented Mar. 14, 1950

2,500,582

UNITED STATES PATENT OFFICE 2,500,582

BETA-ARYLOXY ALDEHYDES AND PREPARATION OF THE SAME

Curtis W. Smith, Berkeley, and Seaver A. Ballard, Orinda, Calif., assignors to Shell Development Company, San Francisco, Calif., a corporation of Delaware No Drawing. Application March 25, 1947, Serial No. 737,098

15 Claims. (Cl. 260—599)

This invention relates to new chemical compounds and to a method for their preparation. More particularly, the present invention relates to aldehydes that have an aryloxy group attached to an aliphatic carbon atom in the beta position relative to the carbonyl group, and to a method for their preparation comprising reacting a phenolic compound with an alpha,beta-unsaturated aldehyde.

One object of the present invention is the provision of a novel class of ether-aldehydes wherein the ethereal oxygen atom connects an aromatic carbon atom to a carbon atom of aliphatic character that is separated from the carbonylic carbon atom by one intervening carbon atom. Another object of the invention is a method for the preparation of compounds in the above-defined class comprising reacting a phenolic compound with an alpha,beta-unsaturated aldehyde. A further object of the present invention is the provision of substituted ether-aldehydes of the class just defined wherein the aryloxy group attached to the beta-carbon atom contains one or more substituents. A still further object of the invention is the provision of substituted beta-phenoxy aliphatic saturated aldehydes in which the phenyl group attached to the ethereal oxygen atom contains one or more substituents, preferably in one or more of the 2,4 and 6 positions, the carbon atom in the phenyl ring to which the ethereal oxygen atom is linked being considered as occupying position No. 1. A particular object of the invention is the provision of compounds according to the foregoing that are derived, structurally speaking, from propionaldehyde, i. e., the provision of the beta-aryloxy propionaldehydes within the foregoing classes of compounds. A related object of the invention is a method for the preparation of the beta-aryloxy propionaldehydes comprising reacting acrolein with a phenolic compound. Other objects will become apparent in the following disclosures of the invention.

The compounds to which the present invention relates and which advantageously may be prepared by the process of the invention, may be described by the structural formula:

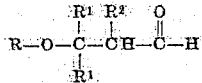

in which R signifies an aromatic group bonded to the adjoining ethereal oxygen atom at an aromatic carbon atom, and in which each $R^1$ and $R^2$ signifies one of the group consisting of the hydrogen atom and organic groups. $R^1$ and $R^2$ preferably represent, as the organic groups, alkyl groups. Although the $R^2$ may, broadly speaking, represent either the hydrogen atom or an organic group, it preferably is limited to representation of the hydrogen atom. In this preferred case, the compounds therefore would have structures defined by the formula:

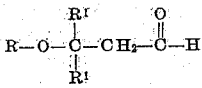

in which R and $R^1$ have their foregoing significance. The compounds of this more limited class may be prepared with greater effectiveness by the herein described process, and hence may offer advantages in the matter of cost and similar considerations compared to the related compounds that have an organic group attached to the alpha carbon atom. When the compounds within this more limited class are considered per se, the presence of two hydrogen atoms attached to the alpha carbon atom contributes desirably to their utility in numerous applications, rendering them particularly desirable apart from the ease and economy with which they may be prepared.

This whole class of substituted aldehydes is characterized by desirable and improved properties that are attributable to the specific position of the aryloxy group in the molecule, i. e., attached to a carbon atom once removed from the carbon atom of the carbonyl group. The compounds of the present class differ notably, for example, from the aryloxy-substituted acetaldehydes that are known in the art, presumably because of the difference in the point of attachment, relative to the carbonyl group, of the aryloxy group. Within the present class, particular and distinctive properties in addition to the foregoing generic characteristic are provided, depending upon the particular nature of the aryl group that is present in the molecule, that is, upon its nuclear configuration and upon its kind and degree of substitution.

The present invention is regarded as embracing compounds defined by the foregoing formulas which may contain either an unsubstituted aryl group attached to the ethereal oxygen atom, or an aryl group containing one or more substituents which may be either organic or inorganic in character. In each case, the aryl group is attached to the ethereal oxygen atom shown in the foregoing formulas at an aromatic carbon atom, i. e., a carbon atom that forms a part of an aromatic ring. The aryl group that is attached to the ethereal oxygen atom may be either a mononuclear aryl group, i. e., a substituted phenyl group or an unsubstituted phenyl group, or it may contain two or more aromatic rings, as in the substituted and the unsubstituted alpha-naphthyl and beta-naphthyl groups, anthryl groups, benzonaphthyl groups, phenanthryl groups, and similar groups containing a plurality of aromatic rings.

Compounds within the present class that contain an unsubstituted aryl group attached to the ethereal oxygen atom and that are included within the broader aspects of the present invention include, among others, the following: 3-phenoxypropanal (beta-phenoxypropionaldehyde), 3-phenoxybutanal (beta-phenoxybutyraldehyde), 3-phenoxy-3-methylbutanal, 3-phenoxy-2-methylpropanal, 3-phenoxy-3-methylpentanal, 3-phenoxy-2-methylpentanal, 3-phenoxy-2-isopropylpropanal, 3-phenoxy-3-methyl-2-ethylpentanal, 3-phenoxy-3-cyclohexylpropanal, 3-phenoxy-3-phenylpropanal, 3-phenoxy-2-tolylpropanal, 3-(alpha-naphthoxy)propanal, 3-(beta-naphthoxy)propanal, 3-(beta-naphthoxy)-butanal, 3-phenoxy-4-pentenal, 3-phenoxy-3-furfurylpropanal, 3-phenoxy-3-methoxypropanal, 3-phenoxy-3-ethoxypropanal, 3-phenoxy-3-(methoxymethoxy)-propanal, and homologous and analogous aryloxy aldehydes wherein the aryloxy group is attached to a carbon atom of aliphatic character that is separated from the carbonyl group by one intervening carbon atom.

It will be noted that in the above group of compounds and in their analogs and homologs, the aryl group that is attached to the ethereal oxygen atom is an unsubstituted aryl group, but that either or both of the alpha and the beta carbon atoms of the alkanal residue that is attached to the ethereal oxygen atom may be substituted with an organic group. A further group of compounds included within the scope of the present invention comprises those compounds of the herein defined generic class in which the aryl group attached to the ethereal oxygen atom contains one or more substituent groups or atoms. The chemical characteristics of the compounds, and their applicability in various fields of use are determined to an appreciable extent by the particular nature of the substituent or substituents that are attached to the aryl group, and also by the location in the aryl group of the substituent or substituents. The present invention embraces both compounds of the herein defined class that contain one or more organic substituent groups attached to the aryl group, and compounds of the herein defined class that contain one or more inorganic substituent groups or atoms attached to the aryl group.

The invention as it relates to beta-aryloxy aldehydes wherein the aryloxy group contains one or more substituents will be described with particular reference to the beta-phenoxypropanols that contain one or more substituents attached to the phenoxy group. It will be distinctly understood, however, that the invention is regarded as embracing within its broader aspects corresponding compounds in which the aryloxy group contains an aryl group comprising a plurality of fused benzene rings and/or the alkanal residue attached to the ethereal oxygen atom contains groups, or atoms other than hydrogen bonded to either or both of the alpha and the beta carbon atoms. Substituted beta-phenoxypropanals that contain an organic substituent group attached to the phenyl group include, among others, the following: (1) those compounds wherein there is a hydrocarbyl group directly attached to the phenyl group, such as 3-(4-methylphenoxy)-propanal, 3-(2-methylphenoxy)propanal, 3-(3-methylphenoxy)propanal, 3-(4-ethylphenoxy)-propanal, 3-(3-ethylphenoxy)propanal, 3-(2,4-dimethylphenoxy)propanal, 3-(2-methyl-4-ethylphenoxy)propanal, 3-(4-isopropylphenoxy)-propanal, 3-(2-isopropylphenoxy)propanal, 3-(3-isopropylphenoxy)propanal, 3-(3-butylphenoxy)-propanal, 3-(2-isobutylphenoxy)propanal, 3-(4-isobutylphenoxy)propanal, 3-(3-isobutylphenoxy)propanal, 3-(2,4-6-trimethylphenoxy)propanal, 3-(2,3,4-trimethylphenoxy)propanal, 3-(2,4,5-trimethylphenoxy)propanal, 2-(3,4,5-trimethylphenoxy)propanal, and the like and their homologs and their analogs; (2) those compounds wherein there is an alkoxy or an aryloxy group attached directly to the phenoxy group, such as 3-(4-methoxyphenoxy)propanal, 3-(4-ethoxyphenoxy)propanal, 3-(2-methoxyphenoxy)propanal, 3-(4-phenoxyphenoxy)propanal, 3-(2,4-dimethoxyphenoxy)propanal, 3-(2-methyl-4-methoxyphenoxy)propanal, 3-(4-isobutoxyphenoxy)propanal, 3-(2-isopropoxyphenoxy)propanal, and the like and their homologs and their analogs; (3) those compounds wherein there is a carbonyl group attached directly to the phenoxy group, as in the esters 3-(4-carbomethoxyphenoxy)propanal, 3-(4-carbethoxyphenoxy)-propanal, 3-(3-carbomethoxyphenoxy)propanal, 3-(4-carbomethoxy-2-methylphenoxy)propanal and homologous and analogous esters of the 3-(carboxyphenoxy)propanals, as in the ketones such as 3-(4-acetylphenoxy)propanal, 3-(3-butyrylphenoxy)propanal, 3-(2-acetyl-4-methylphenoxy)-propanal, 3-(4-isobutyrylphenoxy)propanal, 3-(4-propionylphenoxy)propanal, 3-(2-propionyl-3-methylphenoxy)propanal, and their analogs and homologs, and in the formyl-substituted 3-phenoxypropanals wherein a formyl substituent group is attached directly to the benzene ring of the phenoxy group.

It will be observed that in the foregoing compounds, at least one hydrogen atom of the benzene ring that forms a part of the phenoxy group has been substituted by an organic group which may be bonded to the aromatic ring by a carbon-to-carbon bond or, for example, by an oxygen-to-carbon bond. One or more of the remaining hydrogen atoms may be replaced by a substituent group or atom, which may be the same as or different from the organic substituent group. The organic substituent groups thus present may be composed solely of carbon and hydrogen, or they may comprise one or more atoms of elements other than carbon and hydrogen. Specific examples of organic substituent groups that contain atoms of elements other than carbon and hydrogen are provided by the compounds in which the organic substituent group contains one or more atoms of oxygen. Other elements which may be present include, for example, sulfur, selenium, nitrogen, etc.

Substituted 3-phenoxypropanals of the herein defined class that contain an inorganic substituent attached directly to the phenyl group include numerous compounds of particular value and utility. As the term "inorganic substituent" is employed in the present disclosure and the claims, it is intended to exclude any substituent which comprises an atom of carbon. Substituted 3-phenoxypropanals that contain an inorganic substituent attached directly to the phenyl group include among others, the following: 3-(4-chlorophenoxy)propanal, 3-(2,4-dichlorophenoxy)propanal, 3-(2,4,6-trichlorophenoxypropanal), 3-(3-chlorophenoxy)propanal, 3-(3,5 - dichlorophenoxy)propanal, the isomeric and/or more highly chlorinated 3-phenoxypropanals, and the analogous compounds which contain one or more atoms of a halogen other than chlorine in addition to or in place of chlorine; 3-(4-nitrophenoxy)propanal, 3-(3,5-dinitrophenoxy)propanal, 3-(3-nitrophenoxy)propanal, 3-(2-chloro-4-nitrophenoxy)propanal, 3-(3-nitro-4-chlorophenoxy)propanal, 3-(3-nitro-4-methylphenoxy) propanal, 3-(4-nitro-2-methoxyphenoxy)propanal, 3-(4-nitro-2-chloro-3-methylphenoxy)propanal, 3-3,5-dinitrophenoxy)propanal, and their homologs and analogs which contain at least one nitro group attached to the phenyl group; and analogous and homologous substituted 3-phenoxypropanals that contain one or more inorganic groups, such as sulfo, hydroxyl, amino, nitroso, and the like. It will be noted that the compounds of the present group may contain in addition to the inorganic substituent one or more organic substituent groups attached to the benzene ring of the phenoxy group, the essential and desirable characteristics of the compounds arising from the presence of the inorganic substituent attached to the phenyl nucleus.

A particularly useful and readily prepared group of compounds falling within the scope of the present invention may be referred to by the structural formula $$R^3-O-CH_2-CH_2-CHO$$

in which $R^3$ represents a phenyl group that is directly attached to the ethereal oxygen atom and which either may be unsubstituted or, more desirably for certain applications, may contain one or more substituents. Generically, the compounds defined by this formula may be referred to as the 3-phenoxypropanals, or the beta-phenoxy propionaldehydes.

The 3-phenoxypropanals include a particularly useful group of compounds which may be referred to by the formula

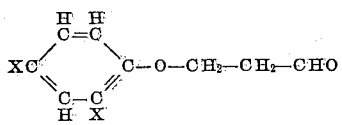

in which each X may represent either an inorganic substituent or hydrogen, no more than one of the two representing hydrogen. In this formula, the group

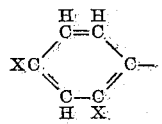

corresponds to $R^3$ in the immediately preceding formula. The compounds represented by the formula when X signifies halogen as the inorganic substituent are particularly valuable.

The 3-phenoxypropanals that have a carbonyl group directly attached to the phenyl ring include a useful and valuable group of complex esters that may be represented by the formula

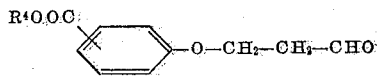

in which $R^4$ signifies a saturated hydrocarbyl group such as a lower alkyl group, a cycloalkyl group or a higher alkyl group containing, say, from 12 to 20 carbon atoms.

One method of preparing compounds of the present class comprises reacting an alkali phenolate, e. g., a sodium phenolate, with a halogen-substituted carboxylic acid (or ester) having a halogen atom, e. g., chlorine, attached to the carbon atom in the beta position, to form a beta-aryloxy carboxylic acid (or ester). The beta-aryloxy carboxylic acid, or its ester, may be converted to the corresponding aldehyde by reduction, by dry distillation with an alkaline earth metal formate, or in other ways. Certain of the reactions thus involved may be expressed as in the following equations

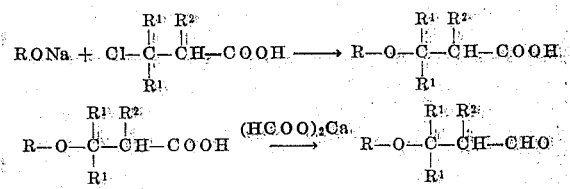

A preferred method of preparing compounds of the class defined herein comprises reacting an alpha,beta-unsaturated aldehyde directly with a phenolic compound according to the equation

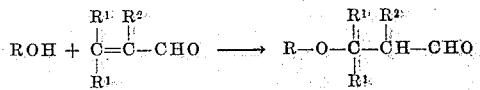

In these equations, ROH signifies a phenolic compound, i. e., a compound in which the hydroxyl group is directly attached to an aromatic carbon atom, and

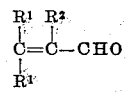

indicates an alpha,beta-unsaturated aldehyde, in which $R^1$ and $R^2$ may have the significance previously defined herein. The formula

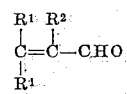

includes among others, the following alpha,beta-unsaturated aldehydes: acrolein, methacrolein, crotonaldehyde, alpha-ethylacrolein, cinnamaldehyde, beta-methylcrotonaldehyde, beta-cyclohexylacrolein, alpha-choloracrolein, beta-methyl-beta - isopropylacrolein, alpha-methyl - beta, beta-diethylacrolein, geranial, alpha-cyclohexyl-beta-phenylacrolein, alpha-isopropylcrotonaldehyde, beta-allylacrolein, and the like and their analogs and homologs. Although a wide variety of alpha,beta-unsaturated aldehydes may be employed in the process whereby the immediately foregoing reaction is effected, the process may be more advantageously executed when there is employed an alpha,beta-unsaturated aldehyde that has a structure defined by the last given formula when $R^2$ represents hydrogen, than otherwise. The most favorable results in the matter of yield of desired product and conversion of the unsaturated aldehyde generally are obtained when acrolein is employed as the alpha,beta-unsaturated aldehyde.

The phenolic compound, ROH, may be any of a wide variety of compounds having a hydroxyl group attached directly to an aromatic carbon atom. The phenolic compound preferably is one containing not more than one phenolic hydroxyl group. It may be a phenolic compound wherein the hydroxyl group is the only group or atom other than hydrogen attached to carbon atoms of the aromatic nucleus, or it may contain one or more substituents in addition to the phenolic hydroxyl group, including, among others, one or more alkyl, aralkyl, alkoxy, acyl, formyl, ester, nitro, sulfo, and similar groups, halogen atoms, and the like. Representative substituents, and combinations thereof, that may be present are illustrated by the substituent atoms and/or groups that are attached to the aryl groups in the specific beta-aryloxy aldehydes referred to hereinbefore.

The reaction between the phenolic compound and the alpha,beta-unsaturated aldehyde to form a beta-aryloxy aldehyde of the herein defined class may be effected by heating a reaction mixture comprising the unsaturated aldehyde and the phenolic compound to a temperature sufficient to cause the desired reaction to occur but insufficient to cause excessive polymerization, decomposition, or other side reactions, to take place. The process may be executed either batchwise, intermittently, or continuously. For example, in a batchwise execution of the process, the unsaturated aldehyde and the phenolic compound may be mixed together in suitable proportions, the phenolic compound and the unsaturated aldehyde preferably being present in about equimolar amounts, and the resultant mixture heated to an elevated temperature for a period of time sufficient to form in appreciable amount a beta-aryloxy aldehyde of the hereindefined class. After completion of the heating step of the process, the resultant mixture may be cooled, or it may be subjected directly to a suitable treatment, such as fractional distillation leading to recovery of the desired product in a more highly purified form.

The reaction may be effected by heating the mixture of reactants in the liquid state and under superatmospheric pressure to a temperature above the boiling point the mixture would have at atmospheric pressure, or by refluxing a suitable mixture of the reactants at either atmospheric pressure or, if desirable or necessary, at pressures either above or below atmospheric pressure. When the reaction is effected at the reflux temperature of the mixture under atmospheric pressure, it may be advantageous to include in the mixture a minor but effective amount of a catalyst for the desired reaction. Mildly alkaline materials, such as pyridine, piperidine, primary, secondary or tertiary aliphatic amines, alkali metal alkalies and alkali metal carbonates, alkali phenolates, alkali alcoholates and the like; acidic substances, such as the mineral acids, including hydrochloric acid, the phosphoric acids, sulfuric acid, hydroiodic acid, etc.; acid-reacting salts, including acid-reacting salts of the mineral acids and of other acids, such as sodium acid sulfate, sodium dihydrogen phosphate, zinc chloride, iron chloride, stannous chloride, sodium acetate, and the like, may be added in catalytic amounts to the reaction mixture, if desirable. Pyridine, and other secondary and tertiary amines are highly effective as catalysts in the present process. Amounts of the catalyst from about 0.02 to about 5 per cent by weight of the reactants may be employed. This range is not highly critical however, and either greater or smaller amounts may be employed if desirable. Amounts of pyridine from about 0.05 to about 1 per cent by weight of the reactants are particularly satisfactory. A catalyst such as the foregoing may be included in a reaction mixture heated to a temperature above the boiling point that it would have at atmospheric pressure.

It may be advantageous to include in the reaction mixture a minor amount of any of the known antioxidants, or polymerization inhibitors, such as the polyhydric phenols, that are effective in reducing or preventing polymerization of the unsaturated aldehydes. Hydroquinone is eminently satisfactory as the antioxidant, although other known antioxidants may be employed effectively in lieu thereof if desired. Amounts of hydroquinone from about 0.02 to about 5 per cent by weight of the aldehyde are generally satisfactory. An inert solvent, such as an aliphatic or aromatic hydrocarbon, an ether, or the like, also may be included in the reaction mixture, although the process generally may be executed in a highly effective manner in the absence of any added solvent.

Equimolar quantities of the phenolic compound and the alpha,beta-unsaturated aldehyde may be employed effectively. In a more general case, from about 0.5 to about 6 moles of the phenolic compound per mole of the aldehyde may be employed. The particular temperature that is most effective for promoting the desired reaction depends in part upon the other conditions of the reaction, and in part upon the particular reactants that are involved. Temperatures of from about 50° C. to about 200° C. are generally applicable. When acrolein is employed as the unsaturated aldehyde, temperatures between about 60° C. and about 150° C. are preferable. When acrolein is reacted with a phenol to form a beta-aryloxy propionaldehyde, in the absence of a catalyst temperatures of from about 100° C. to about 130° C. are preferable. The presence of a catalyst, such as pyridine, may permit a reduction in the reaction temperature to, for example, from about 60° C. to about 120° C. In any case, excessively high temperatures desirably are avoided because of the possibility that excessive resinification may occur in the reaction mixture.

The reaction between the phenolic compound and the unsaturated aldehyde may be effected with the reactants in the liquid state. The unsaturated aldehyde, if liquid under the reaction conditions, ordinarily suffices as a liquefying medium if the phenolic compound is normally solid at the reaction temperature. If the reaction temperature is above the boiling point at atmospheric pressure of the reaction mixture, super-atmospheric pressures sufficient to maintain the liquid state may be employed. The pressure may be either autogenous, or applied by introduction of an inert gas into the reaction vessel. In certain cases the desired reaction may be effected at the reflux temperature of the reaction mixture under atmospheric pressure.

After completion of the reaction, the reaction mixture may be separated into its components in any suitable manner. Fractional distillation, treatment with selective solvents, crystallization, sublimation, and salting-out from solution, are among the available and applicable methods of recovery. The desired beta-aryloxy aldehyde may be recovered and/or purified chemically, if desired, as by converting it to a derivative such as a bisulfite addition product, and purifying, as by crystallization, the derivative and subsequently regenerating the free aryloxyaldehyde.

The compounds that have been provided by the present invention and the process thereof include many highly useful and valuable compounds. The compounds of the herein defined class which contain an inorganic substituent group attached to the aromatic nucleus of the aryloxy group include compounds which are of particular value as chemical intermediates. For example, the beta-phenoxy propionaldehydes which contain one or more nitro groups attached to carbon atoms of the aromatic nucleus may be converted to the corresponding amino derivatives. These amino derivatives appear to have considerable potential value in the preparation of resins, of surface active materials, and of biologically active compounds. Other compounds of the present class are biologically active or convertible to biologically active compounds. Among these may be mentioned in particular the halogen-containing beta-phenoxy propionaldehydes wherein there are one or more halogen atoms attached to the aryl nucleus, preferably in the 2 and/or 4 positions thereof relative to the ethereal oxygen atom.

The esters defined by the formula

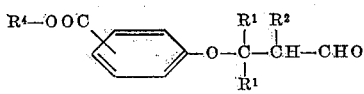

when $R^4$ represents a higher alkyl group containing, say, from 12 to 20 carbon atoms, may be converted to the corresponding alcohols which comprise valuable plasticizers as for resinous or cellulosic compositions and the like. As a group, the compounds provided by the present invention are of particular value as chemical intermediates, a wide variety of useful derived compounds being obtainable therefrom by suitable modification of the characteristic aldehyde grouping or of substituents attached to the aromatic nucleus of the aryloxy group.

The following examples will serve to illustrate the process of the present invention as it may be applied to the preparation of certain preferred compounds of the present invention:

Example I

A mixture of 94 parts of phenol and 56 parts of acrolein (containing 1 per cent hydroquinone) was heated in a closed reaction vessel at 110° C. under autogenous pressure for sixteen hours. The mixture was partially evaporated under reduced pressure until 119 parts remained. This remaining portion was dissolved in ether. The solution was extracted with a 5 per cent solution of sodium hydroxide in water, and washed with a 1 per cent aqueous solution of hydrochloric acid followed by a dilute aqueous solution of sodium bicarbonate. The remaining ethereal solution was dried and distilled. After residual phenol has been removed, beta-phenoxypropionaldehyde (3-phenoxypropanal) was recovered as a clear liquid distilling from 97° C. to 110° C. under a pressure of 0.15 millimeter of mercury. The beta-phenoxypropionaldehyde thus prepared was found to contain 71.0 per cent C (theory, 71.98 per cent) and 6.9 per cent H (theory, 6.71 per cent). It formed a 2,4-dinitrophenylhydrazone melting at 131.3° C. to 132.7° C. and an oxime melting at 141.8° C. to 142.8° C.

Example II

A mixture of 24 parts of phenol, 14 parts of acrolein (containing 1 per cent of hydroquinone) and 0.1 part of pyridine was refluxed for 2½ hours. Unreacted acrolein was removed by distillation under reduced pressure. The beta-phenoxypropionaldehyde thereafter was recovered according to the method followed in Example I. The conversion of phenol to beta-phenoxypropionaldehyde was about 4 per cent; the yield based on phenol consumed was about 51.5 per cent.

Example III

Equimolar quantities of para-chlorophenol and acrolein (containing 1 per cent of hydroquinone) were mixed and heated at 110° C. for 6 hours under autogenous pressure. Upon removal of the excess para-chlorophenol in the manner employed in Example I, and distillation of the remaining portion of the ethereal solution, 3-(4-chlorophenoxy)propanal was recovered in a yield of 70 to 80 per cent based upon the para-chlorophenol consumed. The 3-(4-chlorophenoxy)propanal distilled at 89° C. to 92° C. under a pressure of 0.08 millimeter of mercury, and formed a 2,4-dinitrophenylhydrazone melting at 201° C. to 202° C.

Example IV

Equimolar quantities of para-cresol and acrolein (containing 1 per cent of hydroquinone) were mixed and heated at 110° C. for 6 hours under autogenous pressure. 3-(4-methylphenoxy)propanal was recovered by the recovery and purification method of Example I, in a conversion of 12.5 per cent and in a yield of 71 per cent based upon para-cresol consumed. The 3-(4-methylphenoxy)propanal distilled at 72° C. to 75° C. under a pressure of 0.03 to 0.05 millimeter of mercury.

We claim as our invention:

1. As a new chemical compound, 3-(4-chlorophenoxy)propanal having a structure represented by the formula:

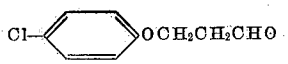

and boiling at about 89° C. to 92° C. under a pressure of about 0.08 millimeter of mercury.

2. As a new chemical compound, a 3-(4-halophenoxy)propanal.

3. As a new chemical compound, a 3-(2,4-dihalophenoxy)propanal.

4. As a new chemical compound, a halogen-substituted beta-phenoxypropionaldehyde, having a halogen atom substituent in at least one of the 2, 4 and 6 positions in the benzene ring.

5. As a new chemical compound, an ether of a beta-oxy lower saturated aliphatic aldehyde, wherein the etherifying radical, which is directly linked to the beta-oxygen atom of said aldehyde, is a phenyl radical having directly substituted thereon at least one atom of halogen.

6. A method of preparing a beta-aryloxy aldehyde comprising heating a liquid mixture of an alpha,beta-olefinically unsaturated aldehyde with a molar excess thereover of a phenolic compound to a reaction temperature from about 50° C. to about 200° C. in the presence of a polymerization inhibitor, and recovering a beta-aryloxy aldehyde from the mixture.

7. A method of preparing a beta-aryloxy propionaldehyde comprising heating a reaction mixture comprising acrolein, a phenolic compound, a polymerization inhibitor, and a catalyst to a temperature from about 60° C. to about 150° C. and recovering a beta-aryloxy propionaldehyde from the mixture.

8. A method of preparing a beta-aryloxy aldehyde comprising heating a liquid mixture comprising an alpha,beta-olefinically unsaturated aldehyde and a phenolic compound at a reaction temperature from about 50° C. to about 200° C. in the presence of a polymerization inhibitor, and recovering a beta-aryloxy aldehyde from the mixture.

9. The method of preparing 3-phenoxypropanal comprising heating a liquid mixture of 94 parts of phenol with 56 parts of acrolein in the presence of about 1%, based upon the weight of acrolein, of hydroquinone, at 110° C. under the autogenous pressure of the mixture for 16 hours, separating unreacted phenol from the resultant mixture, and distilling the residual portion of the mixture to recover 3-phenoxypropanal.

10. The method of preparing 3-(4-chlorophenoxy)propanal comprising heating in the liquid state at a reaction temperature between about 60° C. and about 150° C. a mixture of substantially equimolar proportions of para-chlorophenol and acrolein in the presence of hydroquinone, separating unreacted para-chlorophenol from the resultant mixture, and distilling the residual portion of the mixture to recover 3-(4-chlorophenoxy)propanal.

11. The method of preparing 3-(4-methylphenoxy)propanal comprising heating in the liquid state at a reaction temperature between about 60° C. and about 150° C. a mixture of substantially equimolar proportions of para-cresol and acrolein in the presence of hydroquinone, separating unreacted para-cresol from the resultant mixture, and distilling the residual portion of the mixture to recover 3-(4-methylphenoxy)propanal.

12. The method of preparing a beta-aryloxy propionaldehyde comprising heating in the liquid state at a reaction temperature between about 50° C. and about 200° C. a mixture comprising a phenol and acrolein present in molar proportions of from about 0.5 mole to about 6 moles of the phenol per mole of acrolein, said mixture containing a polymerization inhibitor in an amount from about 0.02 to about 5 per cent by weight of the acrolein, separating unreacted phenol from the resultant mixture, and distilling the residual portion of the mixture to recover the beta-aryloxy propionaldehyde.

13. The method of preparing a 3-phenoxy alkanal comprising heating in the liquid state at a reaction temperature between about 50° C. and about 200° C. a mixture comprising phenol, a 2-alkenal, and from about 0.02 to about 5 per cent of a polymerization inhibitor based upon the weight of the 2-alkenal, and recovering said 3-phenoxy alkanal from the resultant mixture.

14. The method of preparing a 3-aryloxy alkanal comprising heating in the liquid state at a reaction temperature between about 50° C. and about 200° C. a mixture comprising a 2-alkenal and a phenol present in molar proportions of from about 0.5 mole to about 6 moles of the phenol per mole of the 2-alkenal, said mixture containing a polymerization inhibitor in an amount from about 0.02 to about 5 per cent by weight of the 2-alkenal, separating unreacted phenol from the resultant mixture, and distilling the residual portion of the mixture to recover the 3-aryloxy alkanal.

15. The method of preparing a 3-(4-halophenoxy)propanal comprising heating a liquid mixture comprising acrolein and a 4-halophenol at a reaction temperature from about 50° C. to about 200° C. in the presence of a polymerization inhibitor, and recovering a 3-(4-halophenoxy)-propanal from the mixture.

CURTIS W. SMITH.
SEAVER A. BALLARD.

REFERENCES CITED

The following references are of record in the file of this patent:

UNITED STATES PATENTS

| Number | Name | Date |
|---|---|---|
| 1,607,293 | Moreu et al. | Nov. 16, 1926 |
| 1,902,070 | Halibig et al. | Mar. 21, 1933 |
| 2,282,928 | Bauer | May 12, 1946 |

OTHER REFERENCES

Maksorow et al.: "Industrial and Engineering Chemistry," vol. 24, pages 827–832 (1932).

Stoermer: "J. Liebig's Annalen der Chemie," vol. 312, pages 271–285 (1900).

V. Braum et al.: Berichte, vol. 45, 384, 385 and 394 to 397, 1252-3 (1912).